(12) United States Patent
Wang

(10) Patent No.: US 6,776,189 B1
(45) Date of Patent: Aug. 17, 2004

(54) FOUR-WAY SWITCH STRUCTURE OF A FLUID CONTROL VALVE

(76) Inventor: Hsin-Fa Wang, No. 68, Mou Tan Lane Lu Kang Town, Chang Hua Hsien (TW)

( * ) Notice: Subject to any disclaimer, the term of this patent is extended or adjusted under 35 U.S.C. 154(b) by 0 days.

(21) Appl. No.: 10/464,908

(22) Filed: Jun. 20, 2003

(51) Int. Cl.[7] ............................................. F16K 11/06
(52) U.S. Cl. ................................................ 137/625.46
(58) Field of Search ................................... 137/625.46

(56) References Cited

U.S. PATENT DOCUMENTS

| | | | |
|---|---|---|---|
| 2,908,293 A | * 10/1959 | Johnson | 137/625.46 |
| 2,952,274 A | * 9/1960 | Anderson | 137/625.46 |
| 5,000,225 A | * 3/1991 | Murdoch | 137/625.46 |
| 6,186,174 B1 | * 2/2001 | Yurchision et al. | 137/625.46 |

* cited by examiner

*Primary Examiner*—John Fox
(74) *Attorney, Agent, or Firm*—Charles E. Baxley

(57) ABSTRACT

A fluid control valve includes a main body and a switching member. The main body is provided with a chamber in which the switching member is rotatably disposed. The chamber is in communication with an inlet and two outlets. The switching member is formed of a connection rod and a horizontal disk. The connection rod is fastened to a control knob by which the switching member is actuated to turn. The horizontal disk is provided with two through holes via which the inlet is in communication with the outlets. The fluid control valve can be operated in four different ways, thanks to the horizontal disk of the switching member.

1 Claim, 7 Drawing Sheets

FOUR-WAY SWITCH STRUCTURE OF A FLUID CONTROL VALVE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a cut-out structure of the fluid control valve, and more particularly to a four-way switch structure of the fluid control valve.

BACKGROUND OF THE INVENTION

The conventional fluid control valves are generally designed to regulate the pathway of fluid in a one-way or two-way manner. As a result, the conventional fluid control valves are rather limited in function. The functional enhancement of the conventional fluid control valves is attainable by an additional use of other control valves at an extra cost.

BRIEF SUMMARY OF THE INVENTION

The primary objective of the present invention is to provide a fluid control valve which is capable of four-way operation and is simple in construction.

In keeping with the principle of the present invention, the foregoing objective of the present invention is attained by a fluid control valve comprising a main body, a control knob, a switching member, and a support member. The switching member is disposed in a valve chamber of the main body such that the switching member is fastened with the control knob, and that the switching member is supported by the support member. The switching member has a horizontal disk which is provided with two through holes capable of being aligned with two through holes of the valve chamber. The valve chamber is provided with a connection hole for connecting a fluid inlet. The two through holes of the valve chamber are connected respectively with a fluid outlet. The horizontal disk of the switching member is actuated by the control knob to turn horizontally so as to align the two through holes of the horizontal disk with the two through holes of the valve chamber, thereby resulting in a four-way operation of the fluid control valve.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
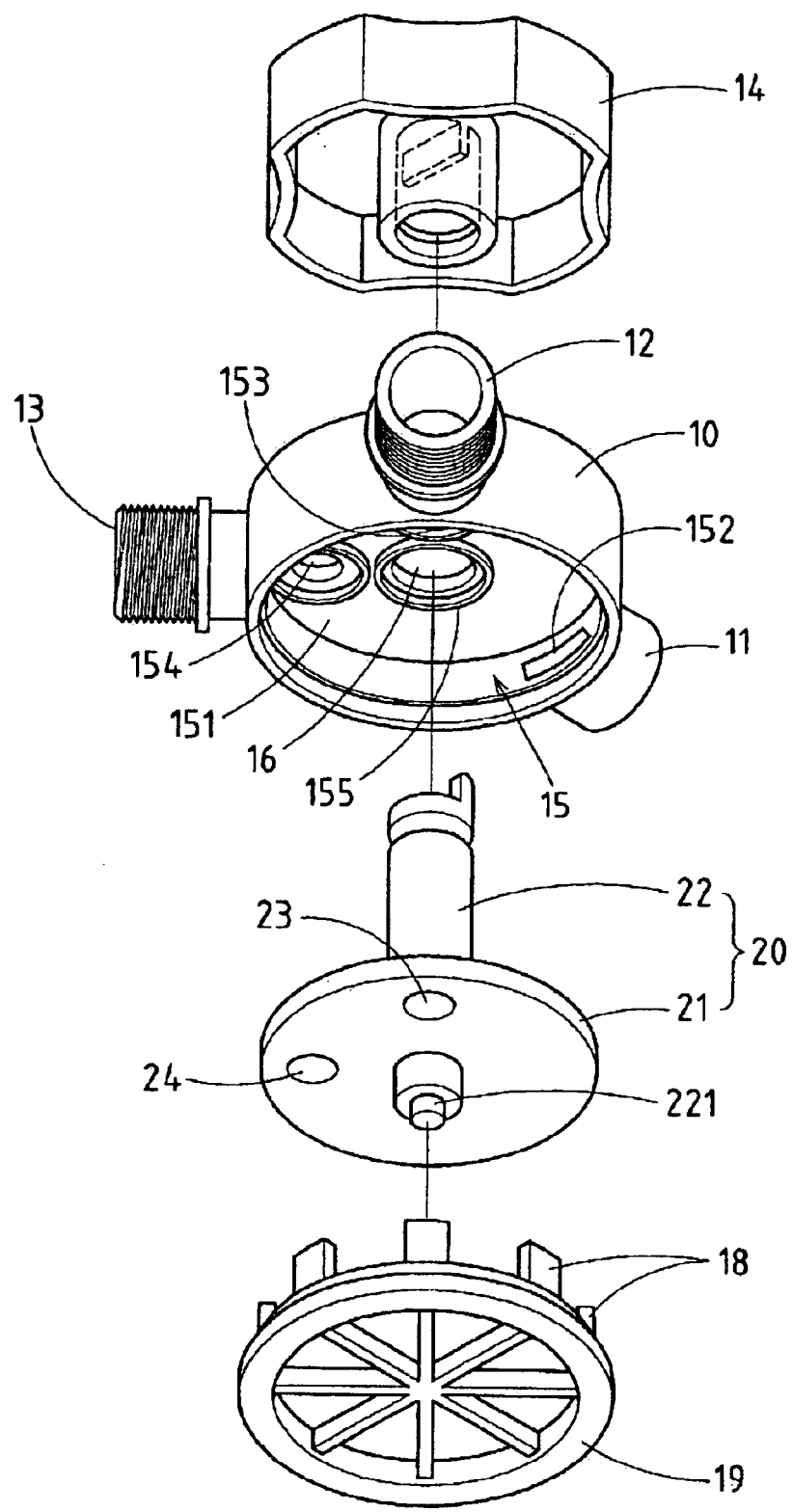
FIG. 1 shows an exploded perspective view of the preferred embodiment of the present invention.
Figure 2:
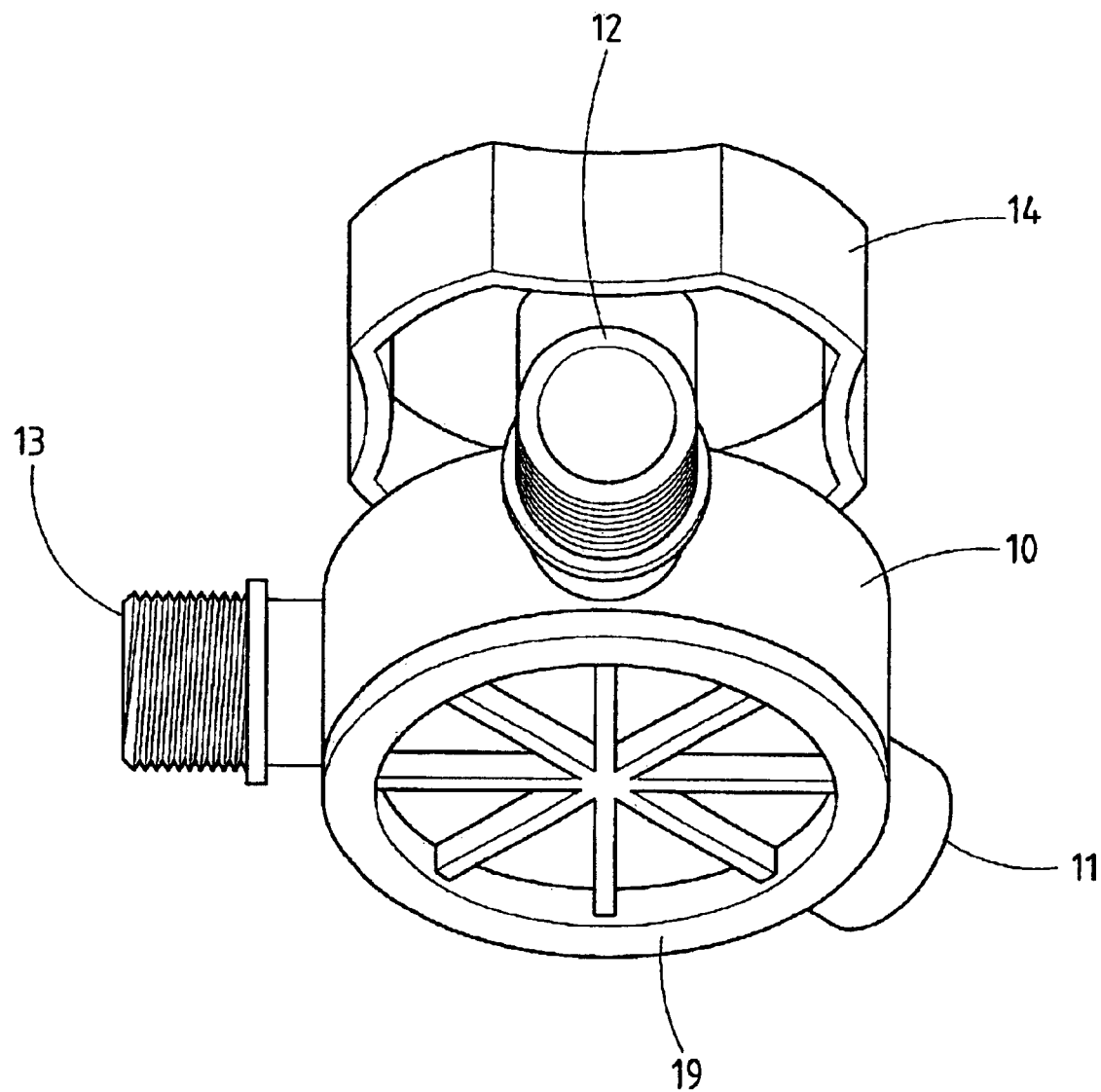
FIG. 2 shows a perspective view of the preferred embodiment of the present invention.
Figure 3:
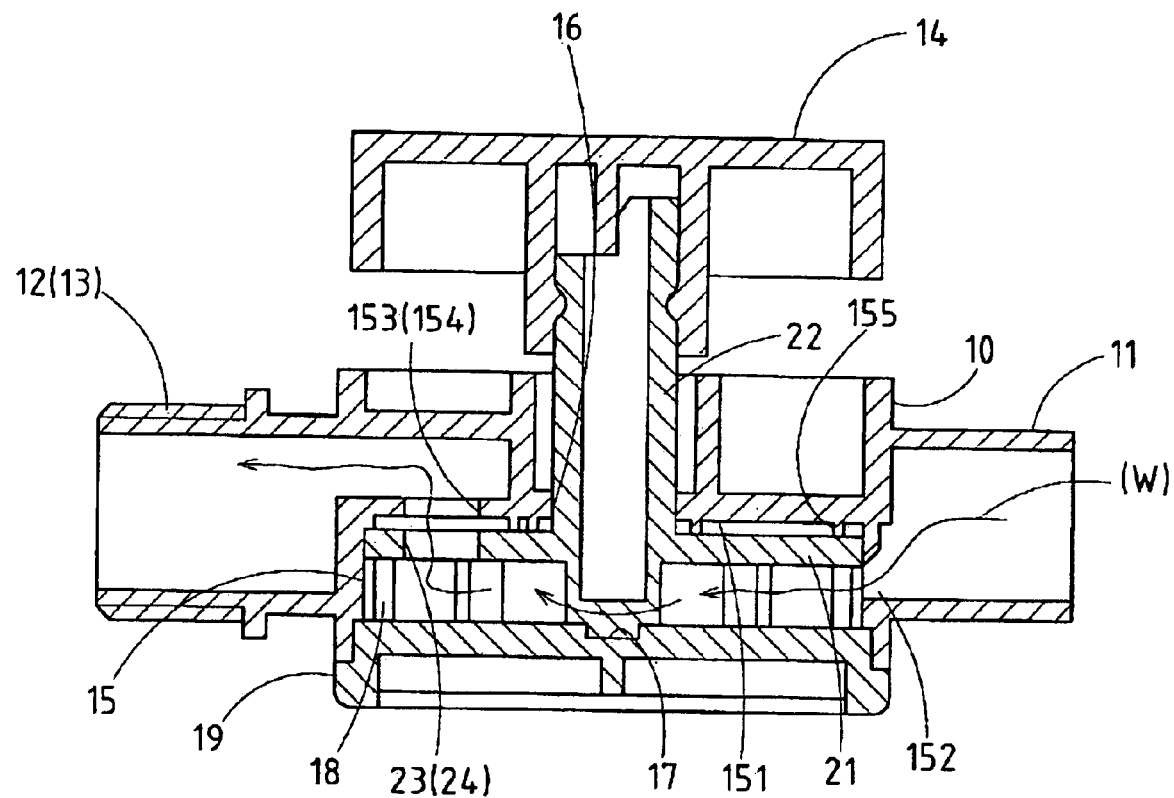
FIG. 3 shows a sectional schematic view of the preferred embodiment of the present invention.

As shown in FIGS. 1–3, a fluid control valve embodied in the present invention comprises a main body 10, a control knob 14, a switching member 20, and a support member 19.

The main body 10 is provided in the interior with a chamber 15 which is in turn provided in the side wall with a connection hole 152, and in a top wall 151 with two through holes 153 and 154. The connection hole 152 is connected with a water inlet 11. The first through hole 153 is in communication with a first water outlet 12, while the second through hole 154 is in communication with a second water outlet 13. The chamber 15 is further provided at the center of the top wall 151 thereof with a center through hole 16 which is provided with a waterproof edge 155.

The switching member 20 is formed of a horizontal disk 21 and a connection rod 22. The switching member 20 is disposed in the chamber 15 of the main body 10 such that the connection rod 22 is fastened with the control knob 14 via the center through hole 16 of the main body 10, thereby enabling the switching member 20 to be actuated by the control knob 14 to turn. The horizontal disk 21 is provided with a first through hole 23 and a second through hole 24. The connection rod 22 is provided with a projection 221 extending from the bottom end thereof such that the projection 221 is located in the underside of the horizontal disk 21.

The support member 19 is provided at the center of an upper side thereof with a slot 17, as shown in FIG. 3, and a plurality of protrusions 18. The support member 19 serves as a bottom wall of the chamber 15 of the main body 10. The support member 19 is fastened to the main body 10 by a high frequency wave pressure. The protrusions 18 of the support member 19 are used to support the horizontal disk 21 of the switching member 20. The projection 221 of the connection rod 22 of the switching member 20 is rotatably located in the slot 17 of the bottom wall 19 of the chamber 15. As a result, there is a gap between the underside of the horizontal disk 21 and the bottom wall 19 of the chamber 15. The gap is located at the same level as the connection hole 152 of the chamber 15, as shown in FIG. 3. In other words, the gap serves as a water passageway.

Figure 4:
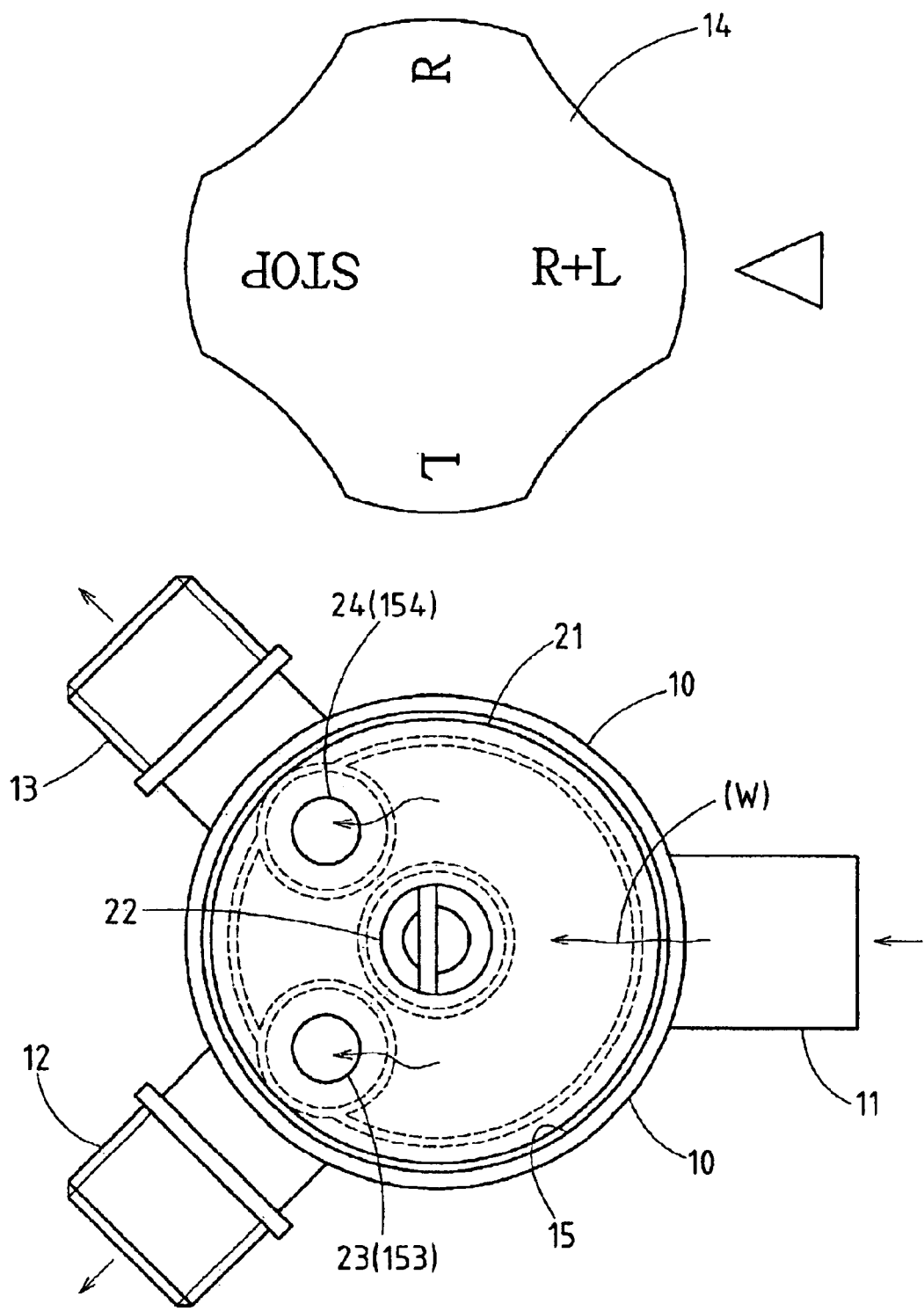
FIG. 4 shows a sectional schematic view of the preferred embodiment of the present invention in an opening state.

In operation, the horizontal disk 21 of the switching member 20 is actuated by the control knob 14 to turn horizontally such that the first through hole 23 of the horizontal disk 21 is aligned with the first through hole 153 of the chamber 15 of the main body 10, and that the second through hole 24 of the horizontal disk 21 is aligned with the second through hole 154 of the chamber 15, as illustrated in FIG. 4. As a result, the incoming water "W" is let out simultaneously by the two outlets 12 and 13 via the through holes 23, 153, 24, and 154.

Figure 5:
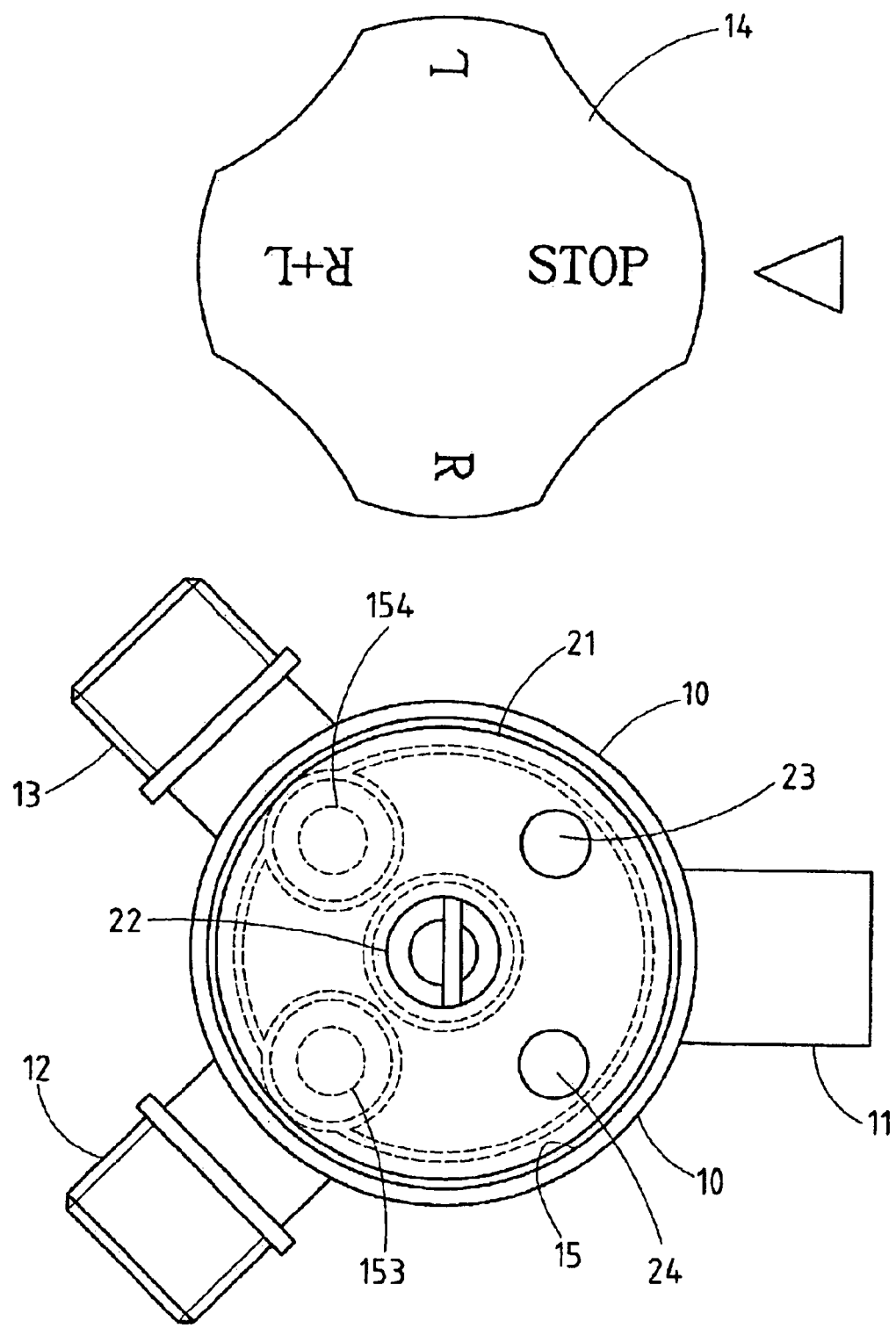
FIG. 5 shows a sectional schematic view of the preferred embodiment of the present invention in a closing state.

In the event that the disk 21 is turned by the control knob 14 in such a way that neither the first through 23 nor the second through hole 24 of the horizontal disk 21 is aligned with the first through hole 153 and the second through hole 154 of the chamber 15, no water is let out from the two outlets 12 and 13, as shown in FIG. 5.

Figure 6:
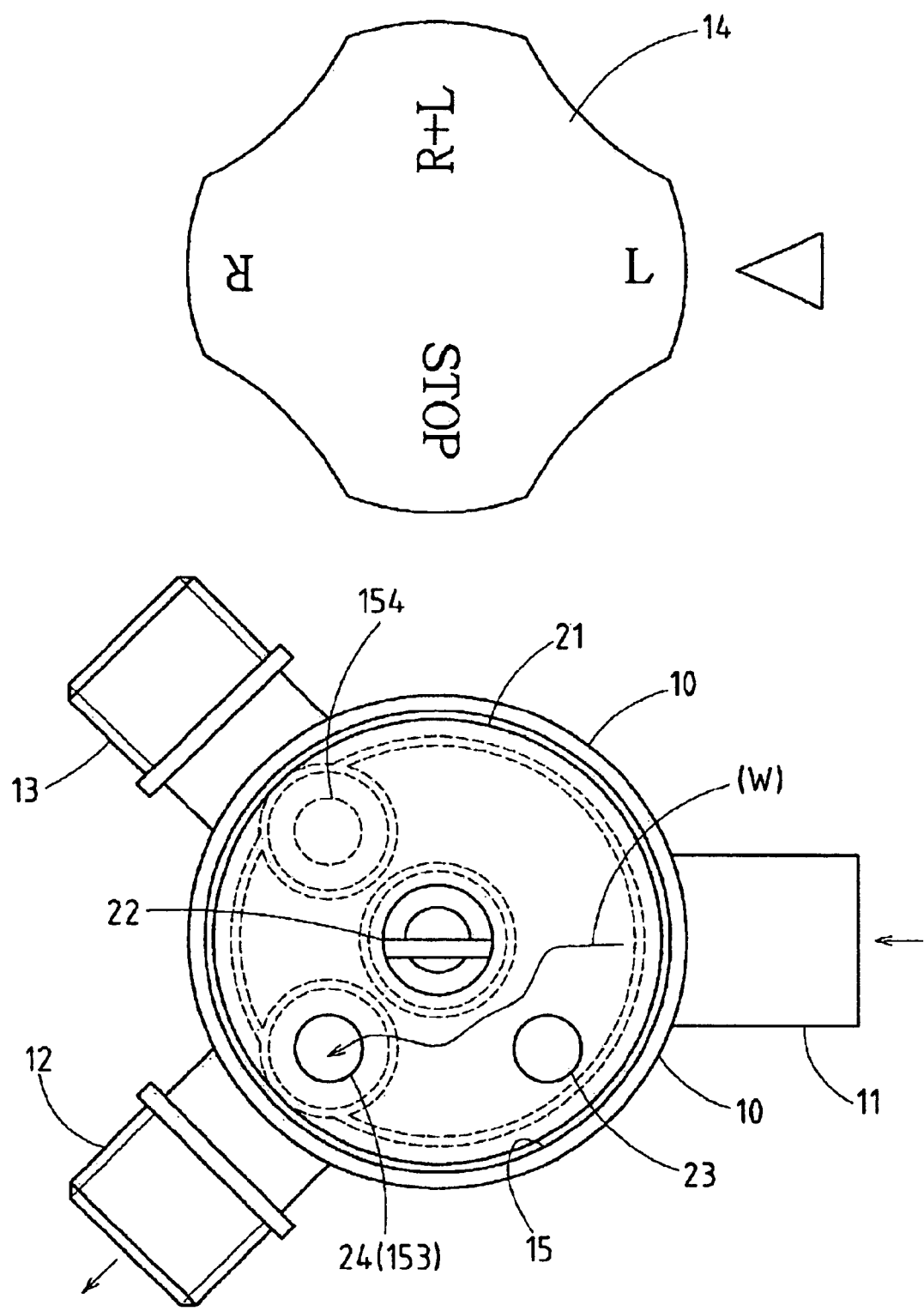
FIG. 6 shows a sectional schematic view of the preferred embodiment of the present invention in a first partial opening state.
Figure 7:
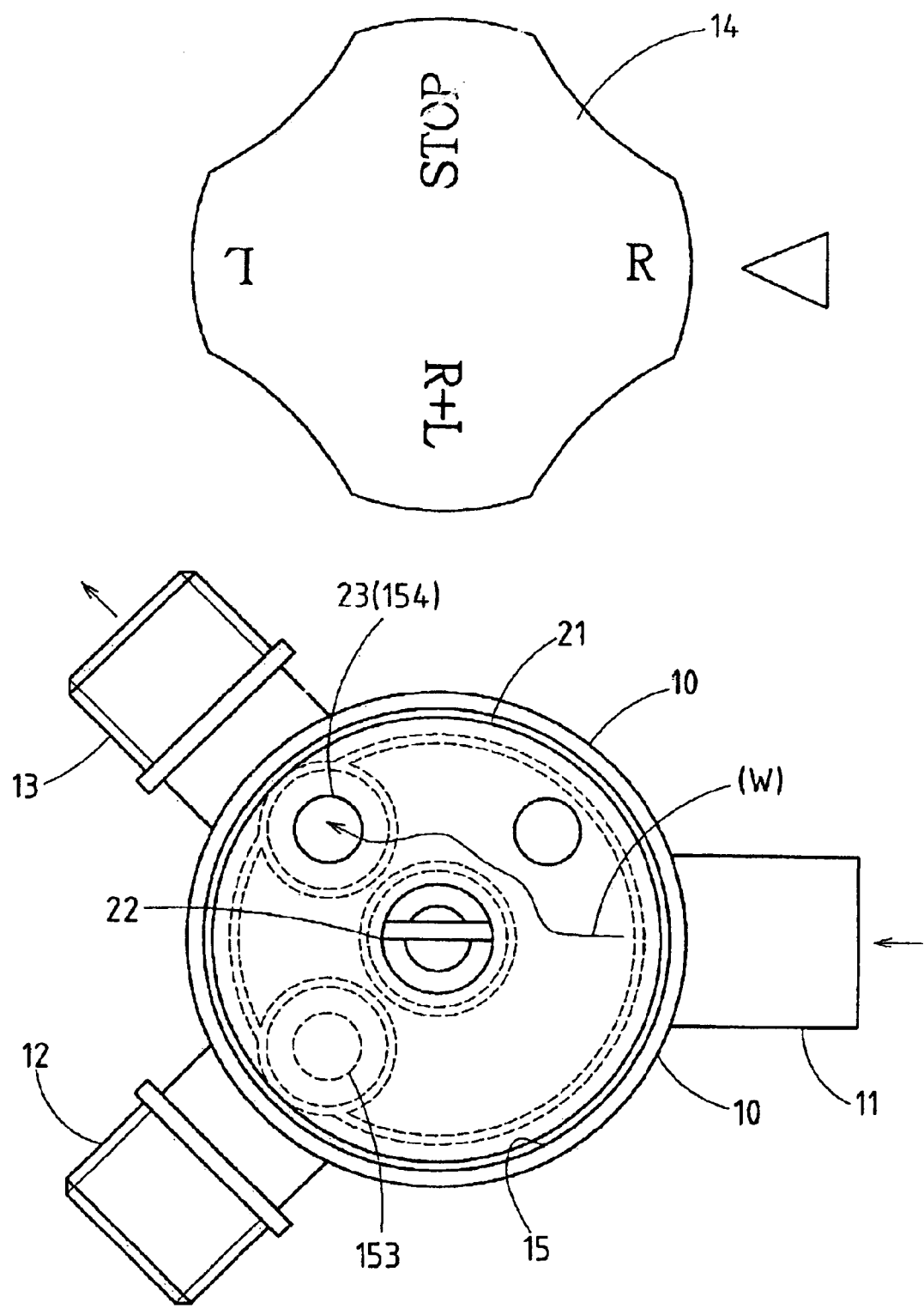
FIG. 7 shows a sectional schematic view of the preferred embodiment of the present invention in a second partial opening state.

As shown in FIG. 6, the horizontal disk 21 is actuated by the control knob 14 to turn in such a manner that one of the two through holes 23 and 24 of the horizontal disk 21 is aligned with one of the two through holes 153 and 154 of the chamber 15 of the main body 10, the water is let out only from the first outlet 12. Similarly, the water is let out only from the second outlet 13 when only one of the two through holes 23 and 24 of the horizontal disk 21 is aligned with one of the two through holes 153 and 154 of the chamber 15 of the main body 10, as illustrated in FIG. 7.

The embodiment of the present invention described above is to be regarded in all respects as being merely illustrative and nonrestrictive. Accordingly, the present invention may be embodied in other specific forms without deviating from the spirit thereof. The present invention is therefore to be limited only by the scope of the following claim.

I claim:

1. A fluid control valve comprising:

a main body provided in an interior with a chamber which is provided in a top wall with a center through hole, and in a side wall with a connection hole in communication with an inlet, said chamber further comprised of, in the top wall a first through hole and a second through hole, with said first through hole being in communication with a first outlet, and with said second through hole being in communication with a second outlet, said chamber further provided in the center of an upper side of a bottom wall thereof with a locating slot; and a switching member rotatably disposed in said chamber of said main body such that said switching member is fastened to a control knob via said center through hole of said chamber of said main body, and that said switching member is actuated by said control knob to turn in said chamber so as to regulate the pathway of a fluid inside said chamber;

wherein said switching member is comprised of a connection rod and a horizontal disk, said connection rod being fastened at one end to said control knob via said center through hole of said chamber of said main body, said connection rod being comprised of, at another end, a projection extending therefrom such that said projection is extended through an underside of said horizontal disk, said switching member being rotatably disposed in said chamber of said main body in such a manner that said projection is rotatably located in said locating slot of the bottom wall of said chamber, and that the underside of said horizontal disk is separated from the bottom wall of said chamber by a distance, thereby resulting in formation of a gap between said horizontal disk and the bottom wall of said chamber, with the gap being in communication with said connection hole of said chamber of said main body, said horizontal disk being comprised of a first through hole in communication with the gap, and a second through hole in communication with the gap whereby said switching member is actuated by said control knob to turn in such a manner that said two through holes of said horizontal disk are simultaneously aligned with said two through holes of said chamber, or that said two through holes of said horizontal disk are simultaneously nonaligned with said two through holes of said chamber, or that only one of said two through holes of said horizontal disk is aligned with one of said two through holes of said chamber.

* * * * *